US008717633B2

(12) United States Patent
Tomizawa et al.

(10) Patent No.: US 8,717,633 B2
(45) Date of Patent: May 6, 2014

(54) PRINTED IMAGE ERASING SYSTEM

(71) Applicants: Hajime Tomizawa, Shizuoka-ken (JP);
Akihiko Fujiwara, Kanagawa-ken (JP);
Shunichi Megawa, Shizuoka-ken (JP);
Masaaki Yasunaga, Shizuoka-ken (JP)

(72) Inventors: Hajime Tomizawa, Shizuoka-ken (JP);
Akihiko Fujiwara, Kanagawa-ken (JP);
Shunichi Megawa, Shizuoka-ken (JP);
Masaaki Yasunaga, Shizuoka-ken (JP)

(73) Assignees: Kabushiki Kaisha Toshiba, Tokyo (JP);
Toshiba Tec Kabushiki Kaisha, Tokyo (JP)

(*) Notice: Subject to any disclaimer, the term of this patent is extended or adjusted under 35 U.S.C. 154(b) by 41 days.

(21) Appl. No.: 13/622,489

(22) Filed: Sep. 19, 2012

(65) Prior Publication Data
US 2013/0070305 A1 Mar. 21, 2013

Related U.S. Application Data

(60) Provisional application No. 61/540,622, filed on Sep. 29, 2011, provisional application No. 61/540,624, filed on Sep. 29, 2011, provisional application No. 61/536,808, filed on Sep. 20, 2011.

(51) Int. Cl.
H04N 1/407 (2006.01)
(52) U.S. Cl.
USPC .......... 358/3.26; 358/1.9; 358/3.06; 358/450; 358/540; 358/3.28
(58) Field of Classification Search
None
See application file for complete search history.

(56) References Cited

U.S. PATENT DOCUMENTS

| 5,607,063 | A | * | 3/1997 | Nishijima et al. ............ 209/584 |
| 5,880,453 | A | * | 3/1999 | Wang et al. ............... 235/462.01 |
| 8,422,892 | B2 | * | 4/2013 | Yoshida et al. .................... 399/2 |
| 8,482,786 | B2 | * | 7/2013 | Ozawa ......................... 358/1.18 |
| 2007/0228005 | A1 | * | 10/2007 | Hasegawa et al. .............. 216/58 |
| 2010/0272449 | A1 | * | 10/2010 | Yoshida et al. ................... 399/2 |
| 2011/0205601 | A1 | * | 8/2011 | Akimoto et al. ............. 358/475 |
| 2011/0304881 | A1 | * | 12/2011 | Saitou .......................... 358/1.15 |
| 2011/0310422 | A1 | * | 12/2011 | Hagiwara .................... 358/1.13 |
| 2012/0038941 | A1 | * | 2/2012 | Megawa ....................... 358/1.13 |
| 2013/0016376 | A1 | * | 1/2013 | Hashidume et al. ........... 358/1.9 |
| 2013/0064558 | A1 | * | 3/2013 | Futamata ....................... 399/15 |

FOREIGN PATENT DOCUMENTS

| JP | 2002-245075 | 8/2002 |
| JP | 2011-215728 | 10/2011 |

* cited by examiner

Primary Examiner — Dung Tran
(74) Attorney, Agent, or Firm — Amin, Turocy & Watson, LLP

(57) ABSTRACT

A printed image erasing system in an embodiment is configured to erase image information obtained by printing both characteristic identification information and document information or only the document information with an erasable color material on a printing medium, comprising: a printer unit configured to print the image information on the printing medium; an erasing unit configured to erase an image printed on the printing medium with the erasable color material; a reading unit configured to read the characteristic identification information on the printing medium to be erased by the erasing unit; and a document management unit configured to manage an erasability condition of the document information on the basis of the characteristic identification information and instruct the printer unit to output new document information according to the erasability condition of the document information that is contained in the characteristic identification information read by the reading unit.

7 Claims, 13 Drawing Sheets

| DOCUMENT ID | VERSION INFORMATION | NUMBER OF TIMES OF PRINTING/MAXIMUM NUMBER OF TIMES | RETENTION PERIOD | ERASURE STATE |
|---|---|---|---|---|
| 0123 | 1 | | | NOT ERASED |
| 0124 | 2 | | | NOT ERASED |
| 0125 | | | Sep.15,2013 | ERASED |
| 0126 | | | Sep.15,2013 | NOT ERASED |
| 0127 | | 1/1 | | NOT ERASED |

FIG.5

| DOCUMENT TYPE | IDENTIFICATION CODE | ERASABILITY |
|---|---|---|
| ORDINARY DOCUMENT | 1000A | ERASABLE |
| IN-HOUSE DOCUMENT | 1000B | ERASABLE |
| SECRET DOCUMENT | 1000C | NON-ERASABLE |
| SALES DIVISION DOCUMENT | 1000D | NON-ERASABLE |
| DEVELOPMENT DIVISION DOCUMENT | 1000E | ERASABLE |

| DOCUMENT TYPE | IDENTIFICATION CODE | DISCHARGE DESTINATION AFTER ERASURE |
|---|---|---|
| ORDINARY DOCUMENT | 1000A | REUSABLE SHEET TRAY |
| IN-HOUSE DOCUMENT | 1000B | REUSABLE SHEET TRAY |
| SECRET DOCUMENT | 1000C | SECRET DOCUMENT TRAY |
| SALES DIVISION DOCUMENT | 1000D | SECRET DOCUMENT TRAY |
| DEVELOPMENT DIVISION DOCUMENT | 1000E | DEVELOPMENT DIVISION DOCUMENT TRAY |

FIG.14

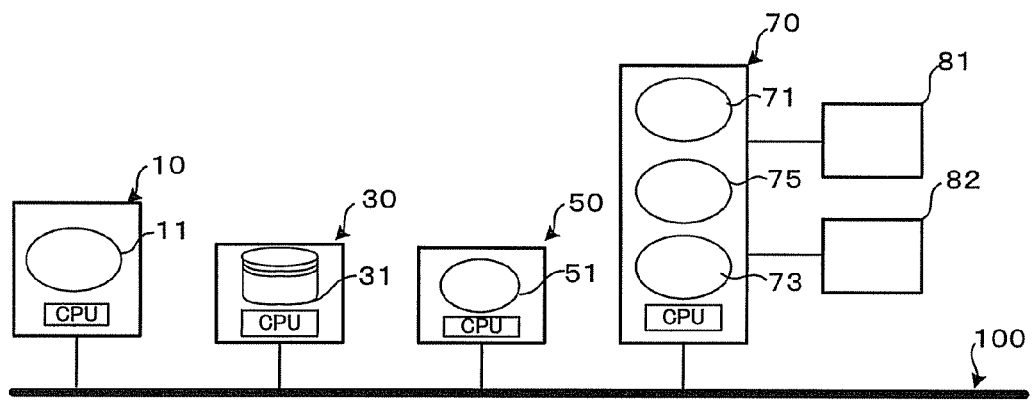

FIG.15

| DOCUMENT TYPE | ERASABILITY | KEYWORD/PATTER FOR DOCUMENT |
|---|---|---|
| ORDINARY DOCUMENT | ERASABLE | |
| IN-HOUSE DOCUMENT | ERASABLE | FOR IN-COMPANY USE ONLY |
| SECRET DOCUMENT | NON-ERASABLE | STRICT SECRET |
| SALES DIVISION DOCUMENT | NON-ERASABLE | FIRST SECTION IN SALES<br>SECOND SECTION IN SALES DIVISION |
| DEVELOPMENT DIVISION DOCUMENT | ERASABLE | FIRST SECTION IN DEVELOPMENT DIVISION<br>AB SYSTEM DEVELOPMENT PROJECT |

PRINTED IMAGE ERASING SYSTEM

CROSS-REFERENCE TO RELATED APPLICATION

This application is based upon and claims the benefit of priority from: U.S. provisional application 61/540,622, filed on Sep. 29, 2011; 61/540,624, filed on Sep. 29, 2011; 61/536,808, filed on Sep. 20, 2011, the entire contents of all of which are incorporated herein by reference.

FIELD

Embodiments described herein relate generally to a technique for managing the traceability of sheets of paper printed using an erasable printing method.

BACKGROUND

In one type of conventional image forming apparatus, images are formed using a color material that changes its properties by, for example, heating so that objects printed with the color material can be made invisible. In such an image forming apparatus, an ordinary multi function peripheral (MFP) is used in a printing process. When the MFP is of the electrophotographic type, a decolorable toner is used. In such a case, an erasing apparatus is provided separately from the MFP to change the properties of the toner. Printed paper mediums are heated using the erasing apparatus to erase the printed objects, so that the paper mediums can be reused.

When an electronic document file is printed on a printing medium such as a sheet of paper, identification information such as a QR code (registered trademark) or a barcode used as a trace ID of information may be printed on the printing side of the medium. When the printed medium used as an original document is copied, the identification information is analyzed in a scanning step to identify the document, and updated identification information is printed on each copy in a printing step. In this manner, the information of each copy can be traced without using expensive special sheets of paper.

The image forming apparatus for performing printing on mediums and the erasing apparatus can be designed so as to systematically communicate with each other. In this case, a combination of the above techniques allows the contents of a document to be erased to be judged by analyzing identification information on the document. More specifically, when the contents of the document are printed on a medium with, for example, a decolorable toner, the identification information used as a trace ID is printed with the decolorable toner used for the document or an ordinary toner so that the contents of the document can be judged. In this manner, the traceability of the document can be managed, and information about the version, secrecy level, etc. of the contents of the document can thereby be appropriately grasped.

BRIEF DESCRIPTION OF THE DRAWINGS

FIG. 5 is a table showing identification codes and erasability information for different document types in the second embodiment;

FIG. 14 is a system block diagram of a printed image erasing system according to a fourth embodiment;

FIG. 15 is a table showing the relation between erasability and a keyword/pattern for a document for each document type.

DETAILED DESCRIPTION

Printed image erasing systems according to embodiments are configured to erase image information obtained by printing both characteristic identification information and document information or only the document information with an erasable color material on a printing medium.

Each printed image erasing system includes a printer unit configured to print image information on a printing medium, an erasing unit configured to erase an image printed on the printing medium with a decolorable color material, a reading unit configured to read the characteristic identification information printed on the printing medium to be erased using the erasing unit, and a document management unit configured to manage the erasability condition of the document information on the basis of the characteristic identification information and instruct the printer unit to output new document information according to the erasability condition of the document information that is contained in the characteristic identification information read by the reading unit.

The printed image erasing systems according to the embodiments will next be described in detail with reference to the drawings.

First Embodiment

Figures 1A, 1B:
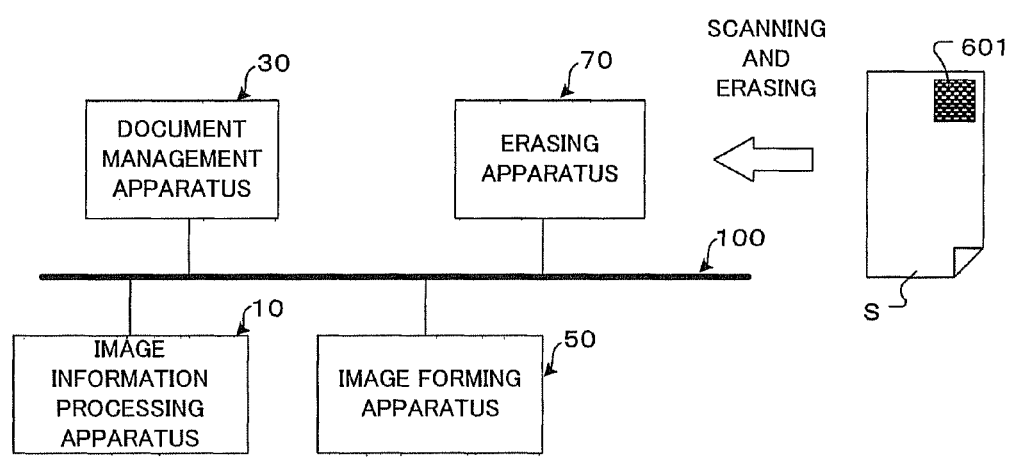
FIG. 1A is a system block diagram illustrating a printed image erasing system according to a first embodiment.
FIG. 1B is a table showing the relation between a document ID and traceability.
Figure 2:
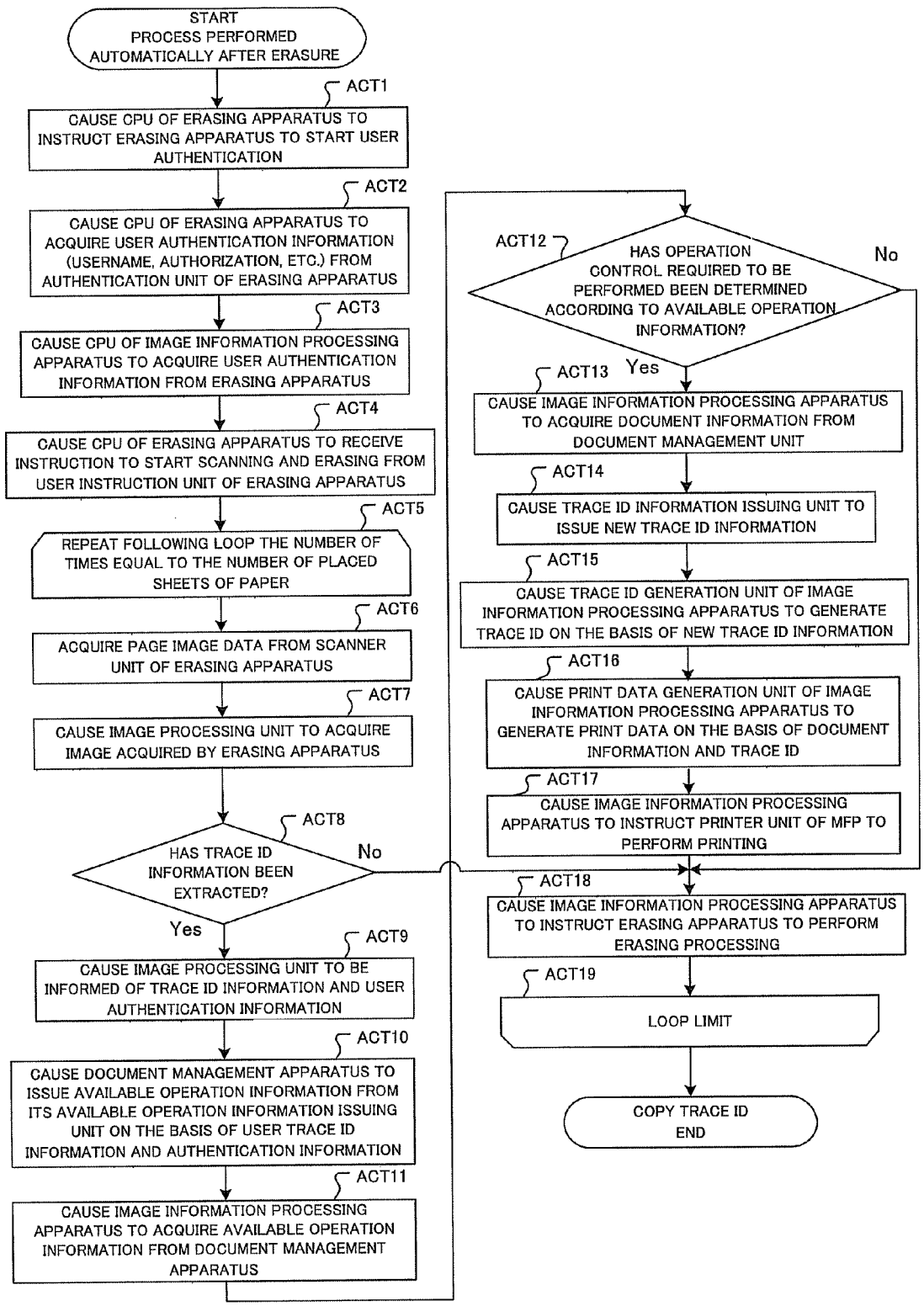
FIG. 2 is a flowchart showing the flow of operation of the system in FIG. 1.

FIG. 1A is a system block diagram illustrating a printed image erasing system according to a first embodiment, and FIG. 1B is a table showing the relation between a document ID and traceability. FIG. 2 is a flowchart showing the flow of operation of the system in FIG. 1.

As shown in FIG. 1A, an image information processing apparatus 10, a document management apparatus 30, an image forming apparatus 50, and an erasing apparatus 70 are connected to a network 100.

The printing side of a medium S having an image printed with a decolorable color material in the image forming apparatus 50 is read by the erasing apparatus 70, and then the image is erased.

An example of the image forming apparatus 50 is an MFP (Multi Function Peripheral). The image forming apparatus 50 include at least: a communication unit configured to send and receive data via the network 100 etc.; a user authentication unit configured to identify and authenticate the user of the image forming apparatus 50 to acquire the user authentication information of the user; a scanner unit configured to read an image of a medium and output document image data; a display unit configured to display a function selection screen, status information, etc. of the MFP; a user instruction unit configured to allow the user to input an instruction with respect to the contents displayed on the display unit; a printer unit configured to print a toner image on a medium with, for example, a decolorable toner; and a processor unit (a processor such as a CPU) configured to control and execute operation of each unit of the MFP. A toner image transferred to a medium is heated and pressurized in a fixing unit and thereby fixed. The decolorization temperature of the decolorable toner is higher than the fixing temperature.

An example of the document management apparatus 30 is a server. The document management apparatus 30 includes: a communication unit configured to send and receive data via the network etc.; a document management unit configured to manage the contents of a document and various types of its attribute information (for example, a security level, distribution permission information for different destinations, and version information); a trace ID information issuing unit configured to issue information used to generate a trace ID of a document managed by the document management unit; an available operation information issuing unit configured to issue available operation information determined on the basis of combined information containing the user authentication information, the trace ID information, etc.; and a processor unit including a processor such as a CPU configured to control and execute operation of each unit.

The erasing apparatus 70 includes: a communication unit configured to send and receive data via the network etc.; a user authentication unit configured to identify and authenticate the user of the erasing apparatus 70 to acquire the user authentication information of the user; a scanner unit configured to read an image of a medium and output document image data; a display unit configured to display a function selection screen, status information, etc. of the erasing apparatus 70; a user instruction unit configured to allow the user to input an instruction with respect to the contents displayed on the display unit; an erasing unit configured to erase the contents printed on a medium using a method appropriate for the properties of the color material used, for example, by heating when the color material is a decolorable toner; and a processor unit including a processor such as a CPU configured to control and execute operation of each unit of the erasing apparatus 70. In the erasing apparatus 70, a paper medium passing through the scanner unit is conveyed to the erasing unit, and the erased paper medium is again conveyed to the scanner unit and then discharged to a prescribed discharge destination according to the erasure results.

The printed image erasing system in the present embodiment is configured as a system that manages the traceability of documents via the network 100 etc. by printing and scanning their trace IDs.

The system in the present embodiment further includes the image information processing apparatus 10.

An example of the image information processing apparatus 10 is a personal computer. The image information processing apparatus 10 include: a communication unit configured to send and transmit data via the network 100 etc.; a trace ID reading unit configured to read a trace ID from document image data outputted from the scanner unit of the image forming apparatus 50 or the scanner unit of the erasing apparatus 70 to extract trace ID information; a trace ID generation unit configured to receive the trace ID information issued by the trace ID information issuing unit of the document management apparatus 30 and generate a trace ID; a print data generation unit configured to generate print data including the contents of a manuscript acquired from, for example, the document management unit of the document management apparatus 30 and an image of the trace ID generated for the contents of the document; an operation control determination unit configured to determine the details of the operation control of the system from the available operation information acquired from, for example, the available operation information issuing unit of the document management apparatus 30; and a processor unit including a processor such as a CPU configured to control and execute operation of each unit of the image information processing apparatus 10.

The use of the image information processing apparatus 10 allows, when the contents of a document are erased or printed, the operation required for the erasing or printing processing to be automatically executed.

Examples of processing for automatic printing that is performed when the contents of a document are erased include processing including printing the latest version of the document automatically when the old version of the document is erased. Examples of processing for issuing an erasing request automatically when the contents of a document are printed include processing including, when the latest version of the document has been printed, displaying a request for erasing the old version of the document automatically and sending a voice message etc. to an announcement unit.

In the present embodiment, when the contents of a document have been unsuccessfully erased, the timing of printing can be changed. More specifically, the latest version of a document is printed in exchange for erasure of the old version of the document. However, when the old version of the document has not been completely erased, the printing of the latest version of the document is stopped. The printing of the latest version of the document is performed after the old version of the document is completely erased.

In FIG. 1A, the MFP 50 used as the image forming apparatus is connected to the erasing apparatus 70, the document management apparatus 30, the image information processing apparatus 10, etc. via the network 100 and operates as a document management system.

The document management apparatus 30 not only manages documents electronically but also manages trace ID information that allows mediums such as sheets of paper to be traced. The trace ID is given to a medium with information being encoded into identification information such as a QR code.

Upon receiving a printing instruction from a client such as a PC connected to the system or a copy instruction from an operation panel of the MFP 50, the MFP 50 acquires trace ID information from the document management apparatus 30 and generates a printed material having the trace ID given thereto.

Upon receiving a scan instruction from the operation panel of the MFP 50, the MFP 50 reads a document medium and determines whether or not the medium has trace ID information. In this reading procedure, a plurality of mediums such as sheets of paper may be read simultaneously. Some mediums may have trace IDs issued by the document management apparatus 30, and some mediums may not have trace IDs issued by the document management apparatus 30. The mediums with no trace IDs may present when the mediums have been generated before the document management system is applied or when the mediums have been generated outside the range of management by the document management system.

In the general configuration diagram in FIG. 1A, the image forming apparatus 50, the document management apparatus 30, the erasing apparatus 70, and the image information processing apparatus 10 are independent devices. In this case, these devices are connected via the network 100 such as Ethernet, and information is exchanged by the communication units of these devices.

However, part or all of these devices may be integrated into a single device. In such a case, the communication units of these devices may be communication means such as a data bus installed in the single device. Also in such a case, a common processor unit in the single device may be used to perform processing.

These apparatuses provide their functions and notification of information through the respective communication units using interfaces provided for use from the outside. In this case, to provide a function or notification of information using the interfaces, a requester processor provides an instruction to execute the processing. A processor receiving the instruction may execute the processing, or the requester processor may directly execute the processing.

FIG. 1B shows part of the management contents of the document management apparatus 30. Document ID 0123 and document ID 0124 represent an old version of a document and a new version of the document, respectively, and the old version of the document has not been erased. A document with document ID 0125 is a document that has been accidentally erased within a retention period (for example, a period in which the document must not be disposed of). Document ID 0126 is a newly added document ID generated because the document with ID 0125 has been accidentally erased and the same document has been newly printed. In document ID 0127, the maximum number of times of printing is one. These document IDs are associated with the owners of the documents with these document IDs.

A document on a paper medium (document ID 0123) is erased using the erasing apparatus 70. A description will be given of the case in which the version of the contents of the document is old (1). Specifically, the version of the document with document ID 0123 (for example, a manual) is old (1), and a new version (2) of the document (document ID 0124) already exists. In this case, the purpose of erasing the old version of a manual, for example, is to prevent operational mistakes that may occur when reference is made to the old contents.

When an old version of a document (manual) has been erased, a new version of the document is printed on a paper medium, and operations are performed with reference to the latest version of the manual.

When a new version of a document is printed after the presence of the new version is known, an old version of the document need be erased. As described above, the operation of erasing an old version of a document and the operation of printing a new version of the document are often preformed in combination. Therefore, to improve the convenience of the user, it is preferable to perform these operations automatically. The flow of this process will be described using a flowchart shown in FIG. 2.

In ACT 1, the processor (CPU) of the erasing apparatus 70 instructs the erasing apparatus 70 to start processing for user authentication using an IC card or an ID and a password inputted. This processing may be started upon detection of a specific operation by the user (for example, when an "authentication" button is pressed) performed according to the contents displayed on the display unit of the erasing apparatus 70 or may be started at specific timing (for example, when the user is automatically logged out after a prescribed idle time and the erasing apparatus 70 goes into a user authentication start mode).

In ACT 2, the CPU of the erasing apparatus 70 instructs its authentication unit to perform user authentication. The user authentication may be performed by comparing the input from the user with the ID/password information of the user stored in the erasing apparatus 70 or by acquiring the card identification information of an IC card and then sending a query to an external authentication server.

In ACT 3, the CPU of the image information processing apparatus 10 acquires, as user authentication information, the username and information about authorization given to the user as user authentication information from the erasing apparatus 70. When the user authentication information is not information relating to security such as operation authorization but information relating to cost management such as restrictions on the types of output functions including copying and printing, the CPU may send a query not only to the authentication server but also to an output management server. In this example, assuming that information indicating the login of Mr./Ms. AAA is acquired as the user authentication information.

In ACT 4, the CPU of the erasing apparatus 70 receives an instruction to start scanning and erasing through the user instruction unit. In this example, the erasing apparatus 70 erases the contents of a paper medium, but a scan for acquiring the contents as an image is preformed before the contents are erased. More specifically, a screen allowing the user to input the instruction to start scanning and erasing is displayed on the display unit of the erasing apparatus 70. Then the user presses, for example, a button for the user instruction unit in the screen, and the above processing is thereby executed. If the erasing apparatus 70 is provided with, for example, an ADF (Auto Document Feeder) and the authenticated user always performs scanning and erasing after a document is placed on the ADF as in the present embodiment, the scanning operation and the erasing operation may be automatically started immediately after the document is placed on the ADF.

The flow starting from ACT 5 is repeated the number of times equal to the number of scanned document pages.

In ACT 6, the CPU of the erasing apparatus 70 instructs its scanner unit to acquire page image data by scanning. In this case, a paper medium conveyed inside the erasing apparatus 70 is scanned by the scanner unit of the erasing apparatus 70 before the paper medium is erased by the erasing unit.

In ACT 7, the CPU of the image information processing apparatus 10 instructs the image information processing apparatus 10 to acquire the page image data from the erasing apparatus 70. This processing can be performed by acquiring the page image data read by the scanner unit of the erasing apparatus 70 via Ethernet when the scanner unit has a function of a network scanner or by reading the page image data through the scanner unit of the erasing apparatus 70 when the scanner unit has a function of a scanner conforming to connection standards such as USB standards.

In ACT 8, the CPU of the image information processing apparatus 10 instruct its trace ID reading unit to analyze the read document image to acquire a trace ID. In this example, the trace ID has been given to a medium S as identification information 601 such as a QR code as shown in FIG. 1A, and trace ID information is extracted by decoding the identification information. If the trace ID information cannot be extracted (No in ACT 8), the process proceeds to ACT 18.

In the present embodiment, if the trace ID cannot be extracted (No in ACT 8), the processing being performed on the entire document to be scanned and erased at one time in the erasing apparatus 70 may be cancelled. Alternatively, the failure in extraction may be presented to the user through the display unit of the erasing apparatus 70, and the erasing apparatus 70 may wait for instructions from the user.

In ACT 9, the CPU of the image information processing apparatus 10 informs the document management apparatus 30 of the user authentication information acquired in ACT 3, the trace ID information extracted in ACT 8, etc.

In ACT 10, the CPU of the document management apparatus 30 instructs its available operation information issuing unit to issue available operation information using the user authentication information, the trace ID information, etc. In this example, assuming that the user authentication information indicates that the user is Mr./Ms. AAA and the trace ID information indicates that the document is a "first edition of an operation procedures manual." Then information indicating that Mr./Ms. AAA is permitted to perform an operation of erasing the "first edition of the operation procedures manual" is issued.

In ACT 11, the CPU of the image information processing apparatus 10 instructs the image information processing apparatus 10 to acquire the available operation information issued in ACT 10.

In ACT 12, the CPU of the image information processing apparatus 10 instructs its operation control determination unit to determine operation control required to be performed according to the available operation information acquired in ACT 11. In this example, additional execution control for "printing a second edition of the operation procedures manual (because the first edition of the operation procedures manual will be erased and no procedures manual will remain at hand)" is determined to be performed, according to the available operation information indicating that "Mr./Ms. AAA is permitted to perform the operation of erasing the first edition of the operation procedures manual." If no operation control is determined to be performed, the process proceeds to ACT 18.

In ACT 13, the CPU of the image information processing apparatus 10 acquires information about the document to be printed from the document management unit of the document management apparatus 30. In this example, the contents of the document (the second edition of the operation procedures manual) are acquired.

In ACT 14, the CPU of the image information processing apparatus 10 acquires new trace ID information issued by the trace ID information issuing unit of the document management apparatus 30. In this example, the contents of "the second edition of the operation procedures manual" that are to be printed by Mr./Ms. AAA are used as the issued new trace ID information.

In ACT 15, the CPU of the image information processing apparatus 10 instructs its trace ID generation unit to generate a trace ID from the trace ID information issued in ACT 14. In this example, the trace ID is encoded into, for example, a QR code (identification information) on the basis of character string information containing the trace ID information and is generated as image information of the QR code.

In ACT 16, the CPU of the image information processing apparatus 10 instructs its print data generation unit to generate print data on the basis of the document information acquired in ACT 13 and the trace ID generated in ACT 15. In this example, the document information is in a PDF format or a document file format specific to an application and converted to data for printing such as PDL data. The image of the trace ID is added to the converted data, and the print data is thereby generated.

In ACT 17, the CPU of the image information processing apparatus 10 instructs the printer unit of the image forming apparatus 50 to perform printing. In this example, the print data generated in ACT 16 is printed using a print function of the image forming apparatus 50 (the print job is received directly or via a printer driver).

In ACT 18, the CPU of the image information processing apparatus 10 instructs the erasing unit of the erasing apparatus 70 to erase the contents of the document. Since printing of the new version has been completed in ACT 17, the old version can be erased. Therefore, the old version is erased without any other processing.

With the above configuration, the operation necessary to be performed before erasing (printing of the new version in this case) can be automatically executed.

In FIG. 1B, the existence of a new version of a document is known. When the new version of the document is printed, a warning urging the owner of the old version of the document to dispose of (for example, erase) the old version is issued. This warning may be issued before the new version is printed or when the owner uses one's ID card etc. to obtain authentication from the MFP 50 or the erasing apparatus 70.

The document with document ID 0125 has been accidentally erased within the retention period. However, since the retention period has not been expired, an identical document has been newly printed by the MFP 50, and document ID 0126 has been given to the printed document. In the document with document ID 0127, the number of times of printing (the maximum number of times of printing) is one for each user. Since the document has already been printed by a specific user, the specific user can no longer print this document.

Erasure of a document by the erasing apparatus 70 may be prohibited according to the degree of secrecy of the document, and a warning urging the user to dispose of the document using, for example, a shredder (registered trademark) may be issued.

Second Embodiment

Figure 3:
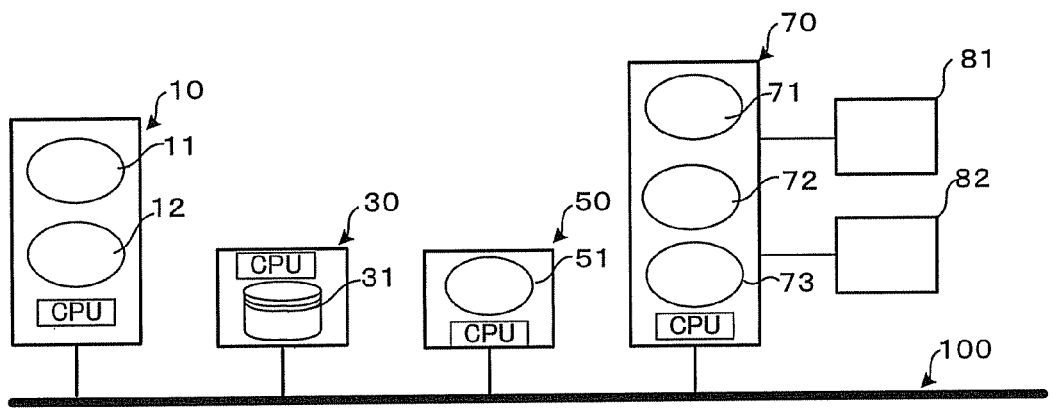
FIG. 3 is a system block diagram illustrating a printed image erasing system according to a second embodiment.
Figure 4:
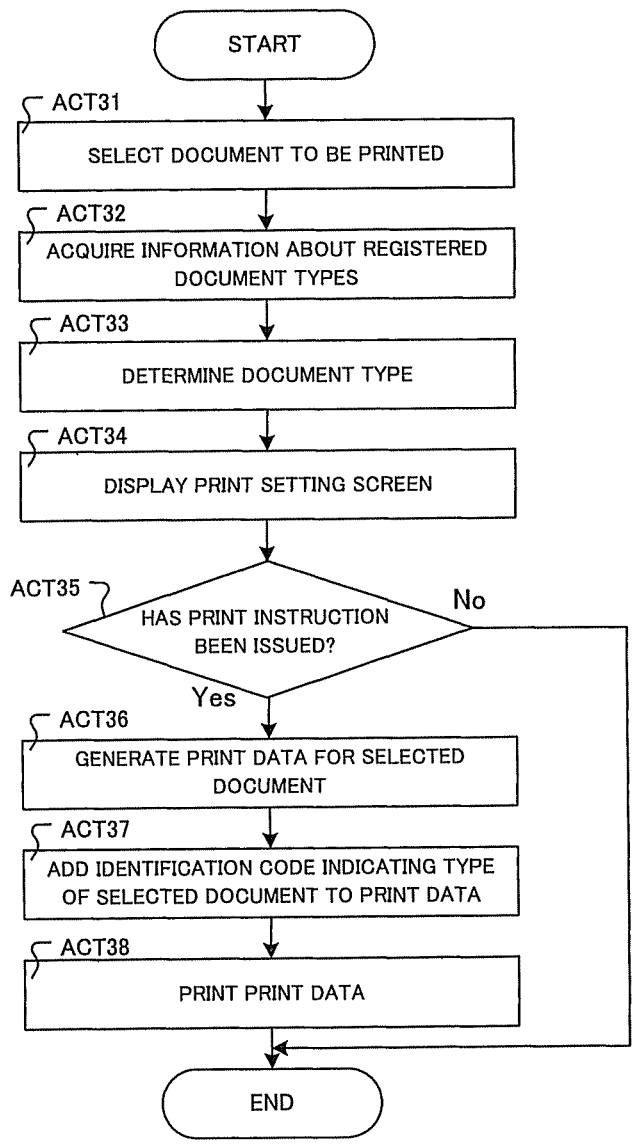
FIG. 4 is a flowchart showing the flow of operation of the system in FIG. 3.
Figure 6:
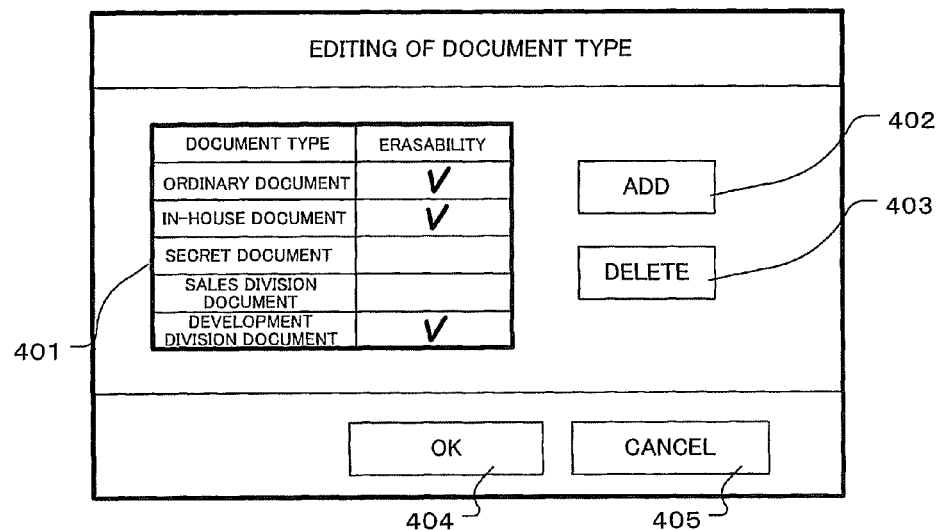
FIG. 6 shows a screen for editing the type of a document in the second embodiment.
Figure 7:
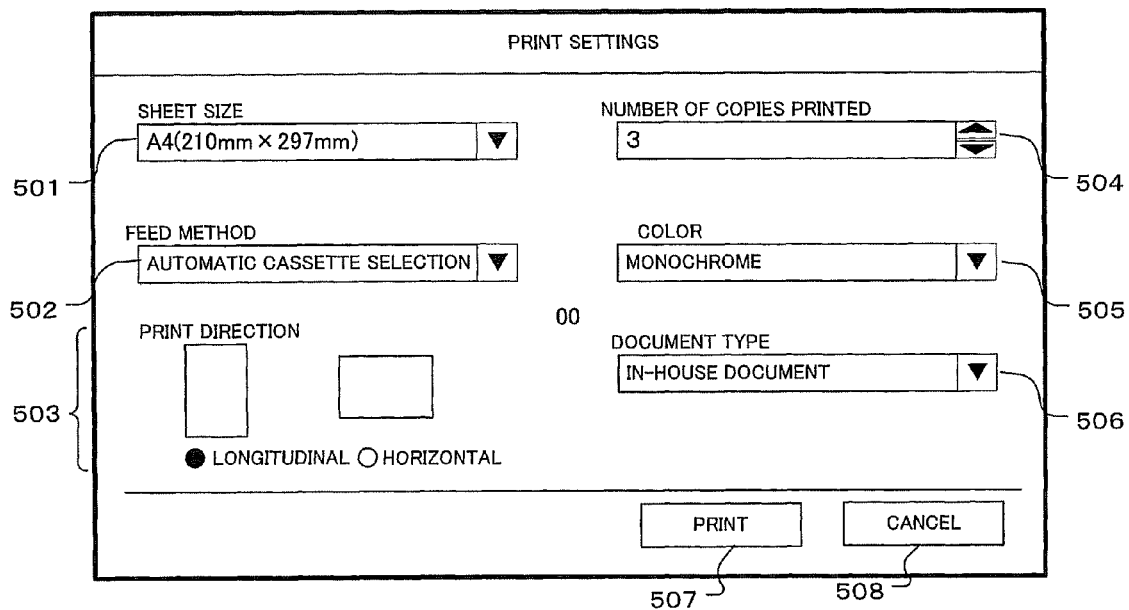
FIG. 7 shows a print setting screen in the second embodiment.
Figure 8:
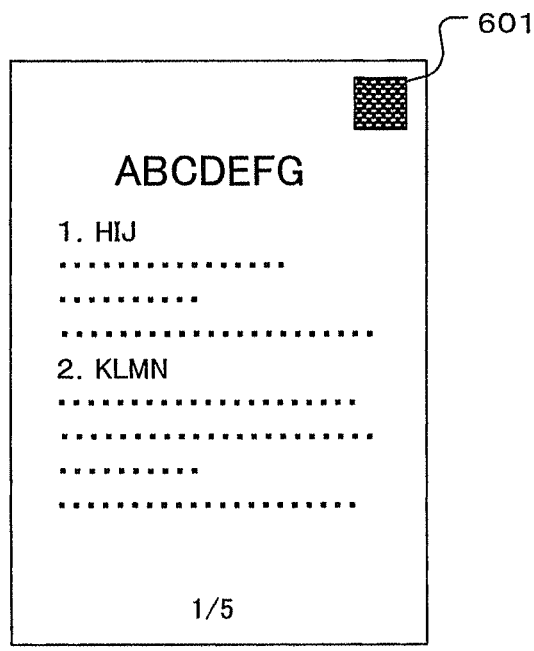
FIG. 8 is a diagram illustrating a sheet of paper having identification information printed thereon in the second embodiment.
Figure 9:
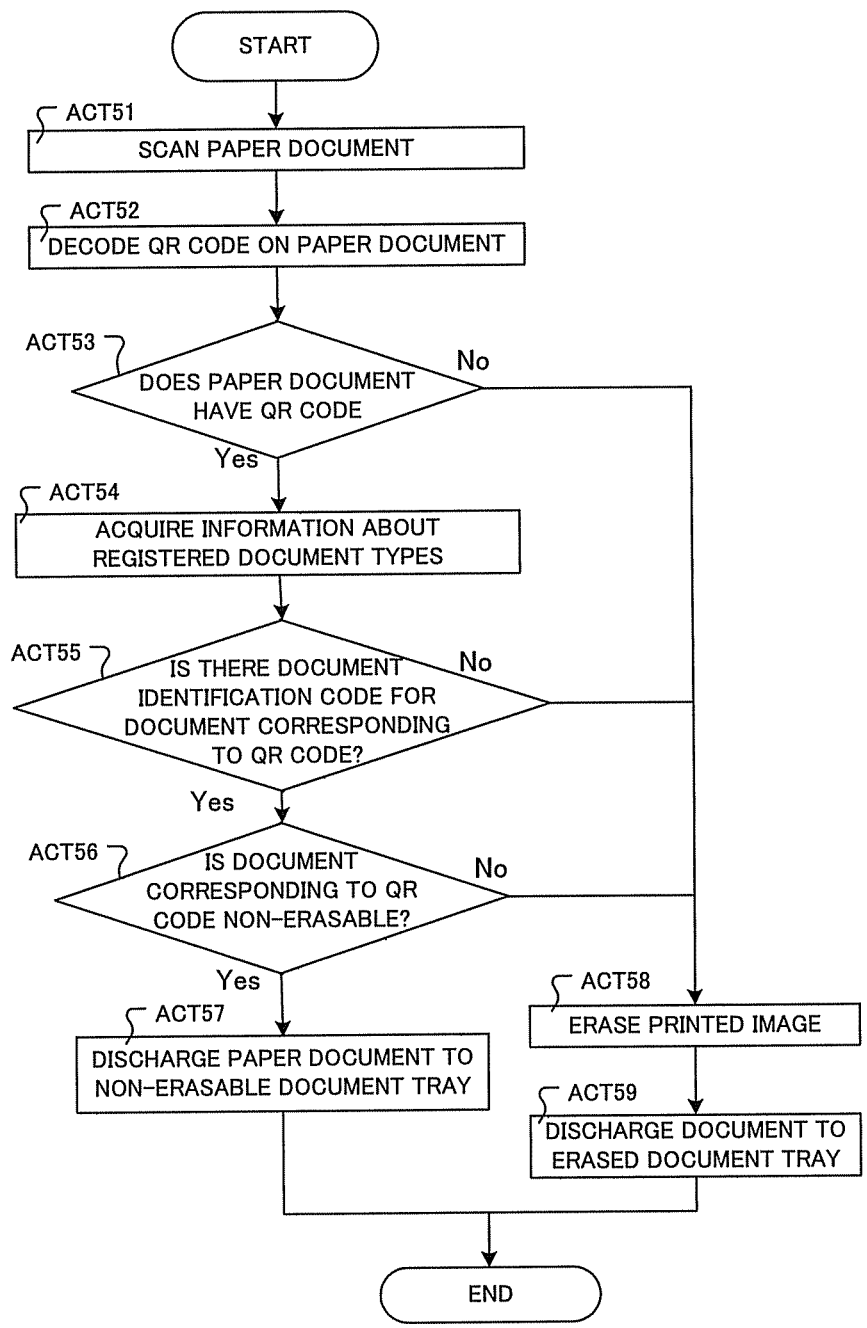
FIG. 9 is a flowchart showing the flow of erasability determination based on the identification information in the second embodiment.

FIG. 3 is a system block diagram illustrating a printed image erasing system according to a second embodiment, and FIG. 4 is a flowchart showing the flow of operation of the system in FIG. 3. FIG. 5 is a table showing identification codes and erasability information for different document types, and FIG. 6 shows a screen for editing the type of a document. FIG. 7 shows a print setting screen, and FIG. 8 is a diagram illustrating a sheet of paper having identification information printed thereon. FIG. 9 is a flowchart showing the flow of erasability determination based on the identification information.

When an erasable image of a paper document is printed on a paper medium, the printed image can be erased using the erasing apparatus 70, and therefore the paper medium (sheets of paper) can be reused. However, the printed image may not be completely erased by the erasing apparatus 70 and may remain present.

Some paper documents contain secret information that should not be read by a third person. When such a secret document is erased by the erasing apparatus 70, the secret information is possibly read by a third person if the document is not completely erased. In such a case, it is desirable that the operator is informed that the erasing apparatus 70 cannot handle a secret document and that the fed secret document is returned to the operator.

Therefore, a description will be given of the printed image erasing system described in the present embodiment, wherein when a paper document fed to the erasing apparatus 70 cannot be erased, the paper document is not erased and is returned to the operator.

As shown in FIG. 3, the printed image erasing system in the present embodiment includes five components, i.e., a client PC 10, a document information management server 30, an MFP 50 serving as an image forming apparatus, an erasing apparatus 70, and a network 100.

The client PC 10 includes a print instruction unit 11 and can issue a print instruction for printing a specific document. The client PC 10 further includes a document type determination unit 12. The document type determination unit 12 determines the type of a document when the document is printed.

The document information management server 30 includes a document information management unit 31 and can store the type information of a document to be printed or the contents of the document. Therefore, the document information stored in the document information management unit 31 can be referenced by sending a query thereto.

The MFP 50 includes a printer unit 51 and prints a document instructed by the print instruction unit 11. In this case, an erasable image of the paper document is printed on a sheet of paper so that the sheet of paper can be reused. More specifically, a toner that forms an image erasable using the erasing apparatus 70 is used for printing.

The erasing apparatus 70 includes an erasing unit 71, an identification code analyzing unit 72, and an erasability determination unit 73. The erasing apparatus 70 further includes: an erased sheet tray 81 to which sheets of paper erased by the erasing apparatus 70 are discharged; and a sheet return tray 82 to which sheets of paper unerasable using the erasing apparatus 70 are discharged.

The erasing unit 71 erases the printed image of a paper document printed by the printer unit 51 and then discharges the erased sheet of paper to the erased sheet tray 81. Before the erasing unit 71 performs erasing, the identification code analyzing unit 72 reads the printed image of the paper document to be erased and analyzes identification code (described later) representing the contents of the document. The type of the paper document can thereby be identified. Then the erasability determination unit 73 determines whether or not the paper document can be erased by the erasing unit 71, according to the identified type of the paper document. When the paper document is not erasable, it is discharged to the sheet return tray 82 as an unerasable sheet of paper.

The network 100 connects the client PC 10, the document information management server 30, the MFP 50, and the erasing apparatus 70 such that they can communicate with each other.

A description will next be given of processing from printing to erasing of a document in the printed image erasing system in the present embodiment.

First, a description will be given of processing for printing a document shown in the flowchart in FIG. 4.

In ACT 31, the operator selects a document to be printed. This operation is performed through the client PC 10. For example, the operator opens a document file to be printed using a document editing application on the client PC 10 and selects a print menu of the application.

In ACT 32, the print instruction unit 11 of the client PC 10 sends a query to the document information management unit 31 to acquire information about the type of the document. The types of documents, identification codes for uniquely identifying the types of the documents, and erasability information of the documents have been stored in the document information management unit 31, as shown in FIG. 5. The print instruction unit 11 acquires the stored information about the type of the document to be printed.

A system administrator can edit the information about the types of documents stored in the document information management unit 31. More specifically, the system administrator can edit the types of available documents using an application for editing the information in the document information management unit 31 via the client PC 10. FIG. 6 shows the screen of this application.

In the edit screen for document types in FIG. 6, the type and erasability of each document currently managed by the document information management unit 31 are displayed in a table section 401. To change the erasability of a document, the checkbox for the corresponding item is activated or deactivated. To add a new document type, an add button 402 is pressed. After the new document type is added, an identification code representing the type of the document is automatically generated and registered. To delete a document type, the item of the document type to be deleted is selected, and a delete button 403 is pressed. After completion of editing, an OK button 404 is pressed, and the edited information is updated.

In ACT 33, the document type determination unit 12 determines the type of the document. In the determination of the document type, when, for example, the operator is a member of a sales division, the user information of the operator has been acquired at the time of login to the client PC 10. Therefore, it can be determined from the user information that the document type is a sales division document.

When a folder including the document to be printed stored there is a folder for storing secret documents, it can be determined that the document type is a secret document.

In ACT 34, the print instruction unit 11 displays a print setting screen on the display of the client PC. FIG. 7 shoes the print setting screen. The operator who has selected the document to be printed in ACT 31 uses this screen to set print settings. Print settings such as sheet size and the number of copies printed can be set on the print setting screen. The document type determined in ACT 33 is displayed in a drop-down list 506. When, for example, the document type has been incorrectly determined by the determination unit 12, a correction can be made. More specifically, the operator operates the drop-down list 506 to change the type of the document to be printed. In this case, the information acquired from the document information management unit 31 in ACT 32 is displayed as selectable document types.

In ACT 35, a determination is made as to whether or not a print instruction has been issued. If a print button 507 on the print setting screen displayed in ACT 34 is pressed, a print instruction is issued, and the process proceeds to ACT 36. If a cancel button 508 is pressed, printing is canceled, and the process is ended.

In ACT 36, the print instruction unit 11 generates print data of the document. More specifically, a function included in a printer driver is used to generate the print data such as PostScript data from the document data.

In ACT 37, the print instruction unit 11 adds an identification code representing the document type selected by the operator to the print data generated in ACT 36. More specifically, an image of the identification information such as a QR code or a barcode, representing the identification code is generated, and the generated image is added to a specific position, such as an upper right corner, in the print data. This image is added to all the pages of the document to be printed.

For example, when a secret document is selected as the type of the document to be printed, a QR code representing 1000c indicating the identification code for the secret document is generated and added to the print data. FIG. 8 shows the print data with the QR code indicating the document type being added thereto. The QR code 601 has been added to the upper right corner of the document on a sheet S.

In ACT 38, the print instruction unit 11 transmits the print data to the printer unit 51 included in the MFP 50 and instructs the printer unit 51 to start printing. The printer unit 51 prints the received print data.

As described above, the operator can select a document, and the selected documents can be printed on the MFP 50. The information about the document type selected by the operator has been added as a QR code to the printed paper document.

Next, the flow of processing for erasing a paper document will be described using the flowchart shown in FIG. 9.

In ACT 51, when the operator feeds a paper document to the erasing apparatus 70, the identification code analyzing unit 72 included in the erasing apparatus 70 scans the paper document to read the printed image.

In ACT 52, the identification code analyzing unit 72 decodes the QR code in the scanned printed image.

In ACT 53, a determination is made as to whether or not the QR code has been successfully decoded. If the QR code has been successfully decoded, the process proceeds to ACT 54. If the QR code has not been successfully decoded, the process proceeds to ACT 58 because the paper document has no QR code.

In ACT 54, the identification code analyzing unit 72 sends a query to the document information management unit 31 to acquire information about the types of stored documents.

In ACT 55, the identification code analyzing unit 72 determines whether or not a document type with an identification code corresponding to the character string obtained by decoding the QR code is included in the registered document types. If there is the corresponding document type, the process proceeds to ACT 56 because the type of the paper document has been identified. If there is no corresponding document type, the process proceeds to ACT 58.

In ACT 56, the erasability determination unit 73 determines whether or not the document type identified in ACT 55 is one that can be erased using the erasing apparatus 70. In this case, the determination is made on the basis of the information about the document type acquired from the document information management unit 31 in ACT 54. If the document is not erasable, the process proceeds to ACT 57. If the document is erasable, the process proceeds to ACT 58.

In ACT 57, since the determination that the paper document is not erasable has been made in ACT 56, the erasability determination unit 73 discharges the paper document to the sheet return tray 82. In this case, the paper document is discharged, and simultaneously the operator is informed that the paper document is not erasable. For example, a message indicating that the paper document is not erasable is displayed on the display of the display unit of the erasing apparatus 70, and an alarm is issued.

In ACT 58, since the fed paper document is erasable, the erasability determination unit 73 instructs the erasing unit 71 to erase the printed image in the paper document. Upon reception of the paper document, the erasing unit 71 erases the printed image in the paper document.

In ACT 59, the erasability determination unit 73 discharges the sheet of paper from which the printed image has been erased to the erased sheet tray 81.

As described above, the processing for discharging the paper document to the sheet return tray 82 without erasing or the processing for erasing the printed image in the paper document and then discharging the paper document to the erased sheet tray 81 can be performed according to the document type of the paper document fed to the erasing apparatus 70.

For example, when the operator prints a document as an ordinary document, a QR code representing identification code 1000A for an ordinary document is added to the printed paper document. When this paper document is fed to the erasing apparatus 70, a determination is made in ACT 56 that the paper document is an erasable ordinary document. Therefore the printed image is erased, and the resultant paper document is discharged to the erased sheet tray 81.

When the operator prints a document as a secret document, a QR code representing identification code 1000C for a secret document is added to the printed paper document. When this paper document is fed to the erasing apparatus 70, a determination is made in ACT 56 that the paper document is a non-erasable secret document. Therefore, the printed image is not erased, and the paper document is discharged to the sheet return tray 82. In this case, the operator recognizes that the paper document fed to the erasing apparatus 70 is a secret document and collects the secret document discharged to the sheet return tray 82.

Third Embodiment

Figures 10, 11:
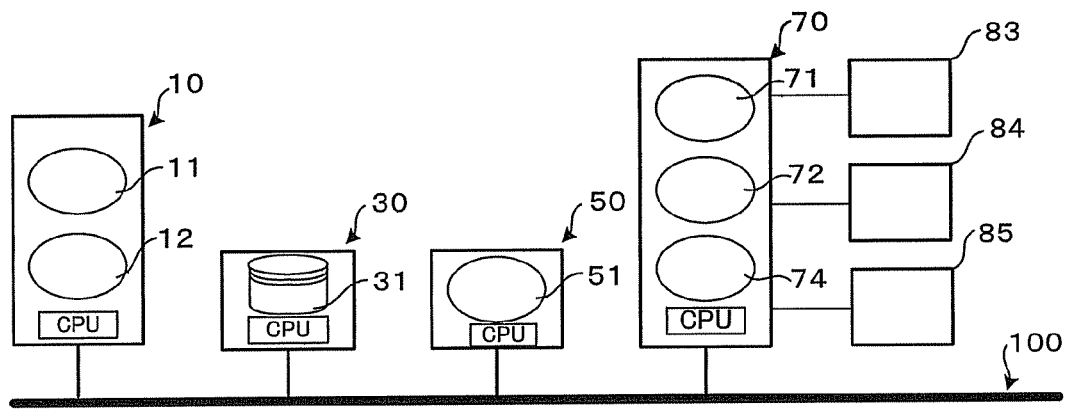
FIG. 10 is a system block diagram of a printed image erasing system according to a third embodiment.
FIG. 11 is a table showing the relation between an identification code and a discharge destination after erasure for each document type in the third embodiment.
Figure 12:
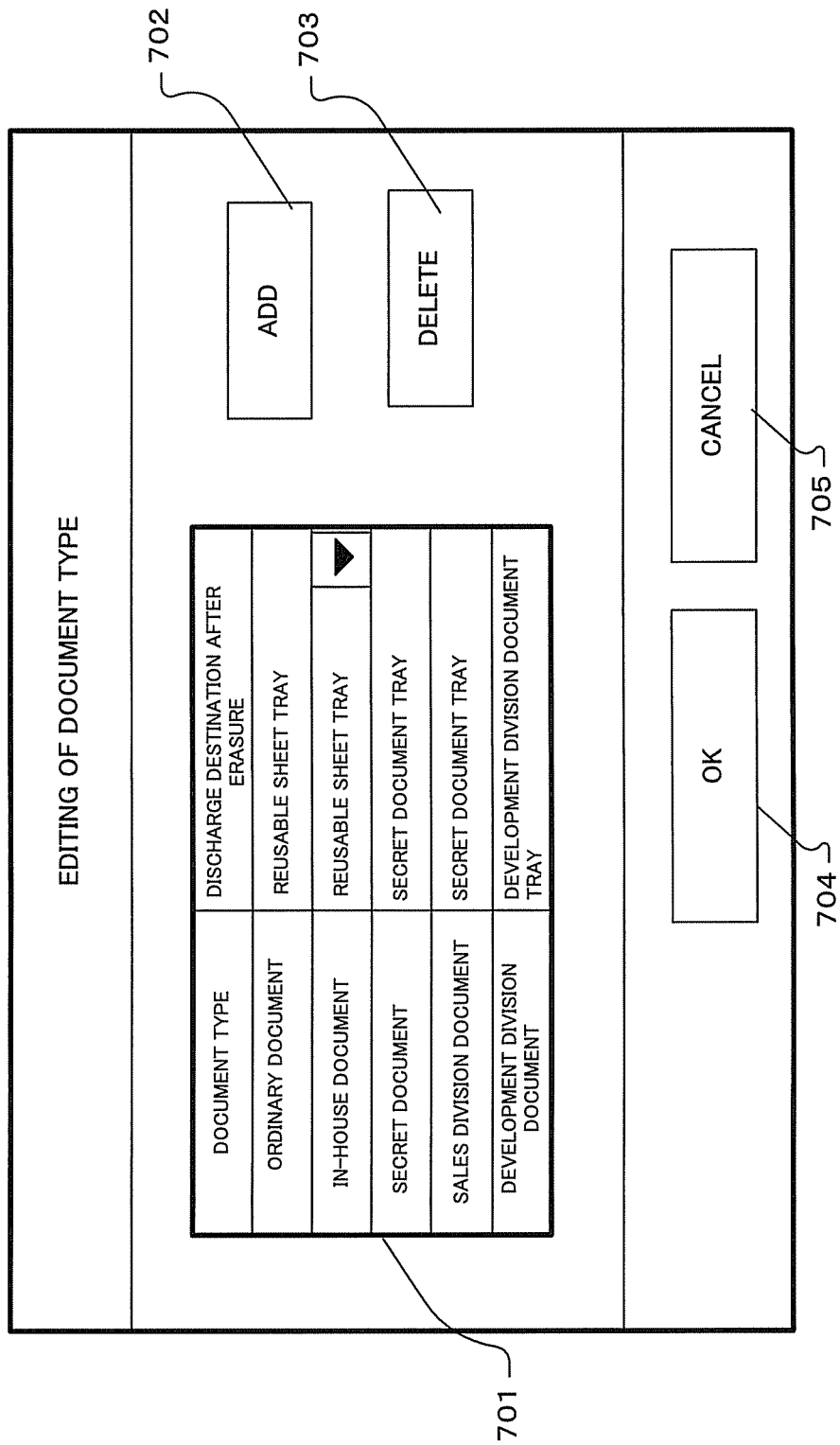
FIG. 12 shows a screen for editing the type of a document in the third embodiment.
Figure 13:
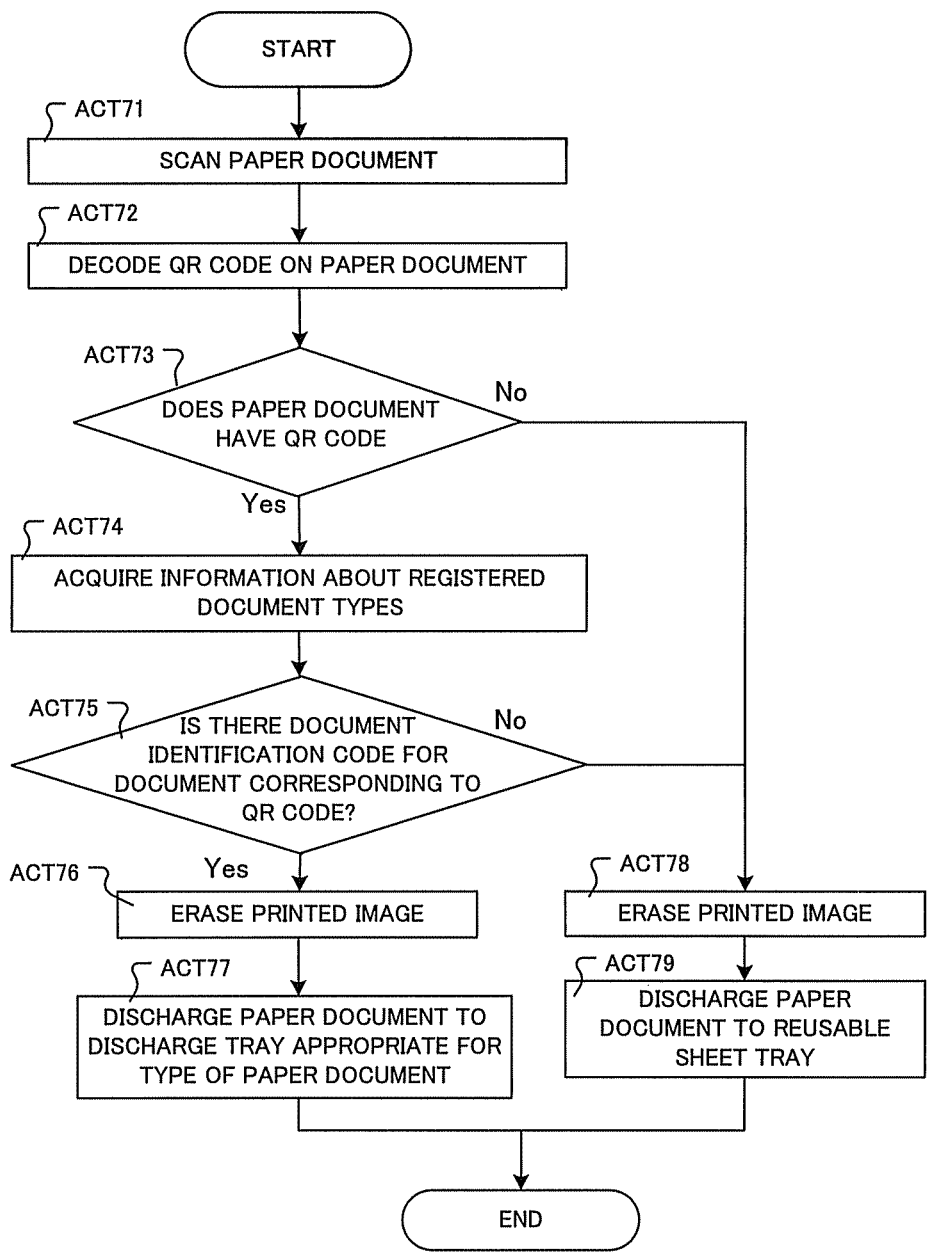
FIG. 13 is a flowchart illustrating the flow of discharge operation after erasure according to the type of a document in the third embodiment.

FIG. 10 is a system block diagram of a printed image erasing system according to a third embodiment, and FIG. 11 is a table showing the relation between an identification code and a discharge destination after erasure for each document type. FIG. 12 shows a screen for editing the type of a document, and FIG. 13 is a flowchart illustrating the flow of discharge operation after erasure according to the type of a document.

In another method used to prevent an unerased secret document fed to the erasing apparatus 70 from being read by a third person, the fed secret paper document is discharged to a secret document tray from which a third person cannot take away the document.

Therefore, in the present embodiment, a description will be given of a printed image erasing system that, when paper documents are erased using the erasing apparatus 70, the erased sheets of paper are distributed into appropriate discharge destinations such as a reusable sheet tray storing sheets of paper that can be reused by any person, a secret document tray storing sheets of paper that cannot be reused by a third person, etc. according to the contents of the fed paper documents.

As shown in FIG. 10, the printed image erasing system in the third embodiment has the same hardware configuration as that of the printed image erasing system shown in FIG. 3.

The printed image erasing system in the present embodiment includes five components, i.e., the client PC 10, the document information management server 30, the MFP 50, the erasing apparatus 70, and the network 100. However, the erasing apparatus 70 includes a reusable sheet tray 83 to which sheets of paper that can be reused by any person are discharged, a secret document tray 84 to which sheets of paper that can be collected only by specific members are discharged, and a technical section document tray 85 from which sheets of paper that can be collected only by members of a technical division.

The secret document tray 84 and the technical section document tray 85 are locked so that only specific members can collect sheets of paper and configured such that members other than the permitted members cannot collect sheets of paper.

As in the printed image erasing system in the second embodiment, the printed image erasing system in the third embodiment has components including the print instruction unit 11 included in the client PC 10, the document information management unit 31 included in the document information management server 30, the printer unit 51 included in the MFP 50, the erasing unit 71 included in the erasing apparatus 70, and the identification code analyzing unit 72 included in the erasing apparatus 70. However, the erasing apparatus 70 includes a discharge destination determination unit 74 instead of the erasability determination unit 73 included in the printed image erasing system in the second embodiment shown in FIG. 3.

After the erasing unit 71 performs erasing processing, the discharge destination determination unit 74 discharges the erased paper document to one of the discharge destinations for different document types according to the type of the paper document identified by the identification code analyzing unit 72. The discharge destinations for different document types are managed by the document information management unit 31.

First, a description will be given of the information about the document types managed by the document information management unit 31. In the printed image erasing system in the second embodiment shown in FIG. 3, the information about erasability using the erasing apparatus 70 has been stored for different document types.

However, the document information management unit 31 of the printed image erasing system in the third embodiment stores identification codes for uniquely identifying document types and information about discharge trays used after erasing, as shown in FIG. 11.

For example, ordinary documents and in-house documents are discharged to the reusable sheet tray 83 after erasing. In this case, when an erased paper document is an ordinary document or an in-house document, the erased paper document is discharged to the reusable sheet tray 83 in the erasing apparatus 70. The sheets of paper discharged to the reusable sheet tray 83 can be used by any person and are again used for printing for the purpose of reuse of the sheets of paper.

Secret documents and sales division documents contain secret information that should not be read by a third person. Therefore, to prevent unerased documents from being read by a third person, such documents are discharged to the secret document tray 84. Since the secret document tray 84 is locked, erased sheets of paper discharged to the tray 84 can be collected only by specific members having the key of the tray.

Development division documents are read only within the development division and should not be read by members other than the members of the development division. Therefore, when the documents are erased using the erasing apparatus 70, the erased documents are discharged to the development division tray 85. As in the secret document tray 84, the development division tray 85 is locked, and the members of the development division can use the key of the lock. Therefore, any member of the development division can use the sheets of paper discharged to the tray 85.

The information about the document types stored in the document information management unit 31 can be set by a system administrator, as in the printed image erasing system in the second embodiment shown in FIG. 3. More specifically, the system administrator can edit the information about the document types on a screen shown in FIG. 12 using a document information editing application installed in the client PC 10.

In FIG. 12, document types currently stored and discharge destinations for these document types are displayed in a table section 701. To change the discharge destination of a document, the type of this document is selected. Then a button of a drop-down list is displayed in the column of the discharge destination. The displayed button is pressed, and a discharge destination is selected from the displayed list. In FIG. 12, for example, an in-house document has been selected, and a button of a drop-down list has been displayed.

To add a new document type, an add button 702 is pressed. To delete a registered document type, the document type to be deleted is selected, and a delete button 703 is pressed. When an OK button 704 is pressed, the information in the document information management unit 31 is updated with the changes being reflected.

Next, a description will be given of print processing in the printed image erasing system in the third embodiment shown in FIG. 10. As in the printed image erasing system in the second embodiment, the print processing in the printed image erasing system in the third embodiment is performed according to the flowchart shown in FIG. 4.

More specifically, the operator opens a document file to be printed using a document editing application and issues a print instruction. In this case, the operator sets the type of the document to be printed. Then a document with a QR code image indicating the document type added thereto is printed.

Next, a description will be given of erasing processing performed in the printed image erasing system in the third embodiment according to the flowchart shown in FIG. 13.

In ACT 71, when the operator feeds a paper document to the erasing apparatus 70, the identification code analyzing unit 72 included in the erasing apparatus 70 scans the paper document to read the printed image.

In ACT 72, the identification code analyzing unit 72 decodes the QR code in the printed image scanned from a sheet of paper.

In ACT 73, a determination is made as to whether or not the QR code has been successfully decoded in ACT 72. If the QR code has been successfully decoded, the process proceeds to ACT 74. If the QR code has not been successfully decoded, the process proceeds to ACT 78 because the paper document has no QR code.

In ACT 74, the identification code analyzing unit 72 sends a query to the document information management unit 31 to acquire information about the types of stored documents.

In ACT 75, the identification code analyzing unit 72 determines whether or not a document type with an identification code corresponding to the character string obtained by decoding the QR code is included in the registered document types. If there is the corresponding document type, the process proceeds to ACT 76 because the type of the paper document has been identified. If there is no corresponding document type, the process proceeds to ACT 78.

In ACT 76, the discharge destination determination unit 74 instructs the erasing unit 71 to erase the printed image in the paper document. Upon reception of the paper document, the erasing unit 71 erases the printed image in the paper document.

In ACT 77, the information about the discharge destination for the document type identified in ACT 75 is acquired, and the sheet of paper is discharged to the set discharge destination. This is performed on the basis of the information about the discharge destination acquired from the document information management unit 31 in ACT 74.

In ACT 78, since the document type cannot be identified, the discharge destination determination unit 74 instructs the erasing unit 71 to erase the printed image in the paper document. Upon reception of the paper document, the erasing unit 71 erases the printed image in the paper document.

In ACT 79, the discharge destination determination unit 74 discharges the sheet of paper from which the printed image has been erased to the reusable sheet tray.

As described above, the processing for erasing a paper document fed to the erasing apparatus 70 and then discharging the erased paper document to a discharge tray corresponding to the set document type of the paper document can be performed.

Fourth Embodiment

Figure 16:
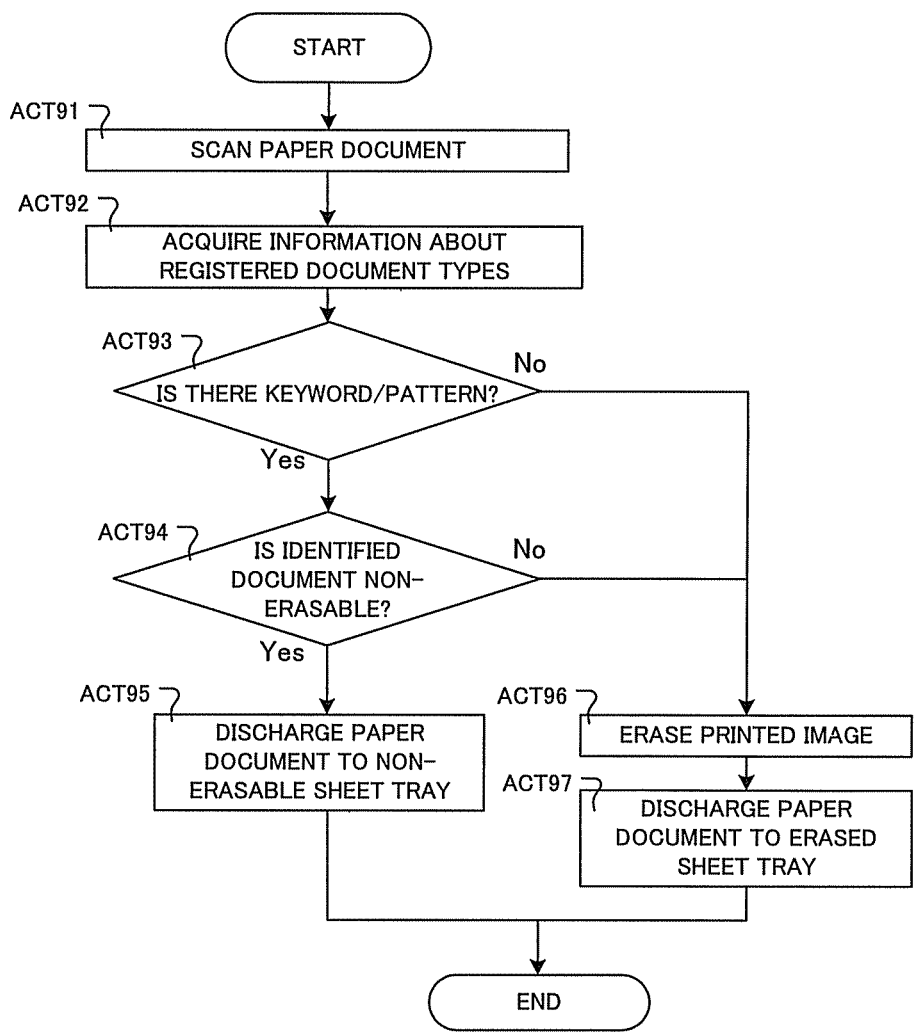
FIG. 16 is a flowchart illustrating the flow of erasure in the system in FIG. 14.

FIG. 14 is a system block diagram of a printed image erasing system according to a fourth embodiment, and FIG. 15 is a table showing the relation between erasability and a keyword/pattern for a document for each document type. FIG. 16 is a flowchart illustrating the flow of erasure in the system in FIG. 14.

In the above-described embodiments, identification information such as a QR code or barcode for identifying the document type of a paper document is additionally printed on the paper document to identify the type of the paper document when it is erased in the erasing apparatus 70. However, in the document erasing system in the fourth embodiment, the document type is identified by analyzing the image of a paper document fed to the erasing apparatus 70 without using the identification information such as a QR code.

The printed image erasing system in the fourth embodiment is obtained by modifying part of the printed image erasing system in the second embodiment shown in FIG. 3. When a non-erasable type paper document is fed, the paper document is not erased and is discharged to the sheet return tray 82, or the non-erasable document tray. The type of a paper document fed to the erasing apparatus 70 is determined from a word or an image pattern in the document.

In the present embodiment, part of the printed image erasing system in the second embodiment shown in FIG. 3 has been modified. The same modification may be made to the printed image erasing system in the third embodiment shown in FIG. 10. In such a case, a determination using a word or an image pattern is made on the printed image of the paper document fed to the erasing apparatus 70. Then the printed image is erased, and the erased sheet of paper is discharged to a discharge tray corresponding to the document type.

The system configuration of the printed image erasing system in the fourth embodiment that performs the above-describe erasing processing is shown in FIG. 14. The printed image erasing system in the fourth embodiment includes a document image analyzing unit 75 instead of the document type determination unit 12 and identification code analyzing unit 72 included in the printed image erasing system in the second embodiment shown in FIG. 3.

As described above, the document image analyzing unit 75 determines the document type from the image of the paper document fed to the erasing apparatus 70. During the determination, information stored in the document information management unit 31 is used.

As in the printed image erasing system in the second embodiment shown in FIG. 3, the document information management unit 31 stores document types and their associated erasability. In addition, as shown in FIG. 15, a keyword or a pattern image used for document type determination is also associated with each document type.

In FIG. 15, an in-house document, for example, is associated with a keyword "FOR IN-COMPANY USE ONLY." When the character string "FOR INTERNAL USE ONLY" is present on a paper document fed to the erasing apparatus 70, a determination can be made that the paper document is an in-house document.

A secret document is associated with a pattern with letters "STRICT SECRET." When a paper document fed to the erasing apparatus 70 includes this pattern, a determination can be made that the document is a secret document.

A description will be given of processing for erasing a paper document in the printed image erasing system in the fourth embodiment using the flowchart shown in FIG. 16. In a print process, since it is not necessary to embed an identification information image as in the printed image erasing system in the second embodiment shown in FIG. 3, ordinary printing is performed.

In ACT 91 in FIG. 16, when the operator feeds a paper document to the erasing apparatus 70, the document image analyzing unit 75 included in the erasing apparatus 70 scans the paper document to read the printed image.

In ACT 92, the document image analyzing unit 75 sends a query to the document information management unit 31 to acquire information about the types of stored documents.

In ACT 93, the document image analyzing unit 75 identifies the type of the paper document using the information about the document types acquired in ACT 92. This is performed by examining whether or not the keyword or pattern image associated with the document type is present in the image of the scanned paper document. If the keyword or pattern image for a document type is present in the scanned image of the paper document, the document type can be identified, and the process proceeds to ACT 94. If the keyword or pattern image is not found, the process proceeds to ACT 96.

In ACT 94, the erasability determination unit 73 determines whether or not the document type identified in ACT 93 is one that is erasable using the erasing apparatus 70. In this case, the determination is made on the basis of the information about the document type acquired from the document information management unit 31 in ACT 92. If the document is not erasable, the process proceeds to ACT 95. If the document is erasable, the process proceeds to ACT 96.

In ACT 95, since the determination that the paper document is not erasable has been made in ACT 93, the erasability determination unit 73 discharges the paper document to the non-erasable document tray.

In ACT 96, since the fed paper document is erasable, the erasability determination unit 73 instructs the erasing unit 71 to erase the printed image in the paper document. Upon reception of the paper document, the erasing unit 71 erases the printed image in the paper document.

As described above, in the fourth embodiment, the processing for discharging the paper document to the sheet return tray 82 without erasing or the processing for erasing the printed image in the paper document and then discharging the paper document to the erased sheet tray 81 can be performed according to the contents of the paper document fed to the erasing apparatus 70.

In the second embodiment described above, a paper document is printed with its document type automatically set, and the printed paper document is fed to the erasing apparatus 70. In this case, when the printed paper document is not erasable, the paper document is not erased and is returned, and the operator is informed that the paper document is not erasable. Therefore, the operator can feed a paper document to the erasing apparatus 70 without paying attention to the erasability of the paper document. When a paper document contains information such as secret information that should not be read by a third person, the paper document can be returned to the operator before it is erased.

In the third embodiment described above, a paper document is printed with its document type automatically set. Therefore, when the printed paper document is erased using the erasing apparatus 70, the document is discharged to a discharge tray corresponding to the type of the paper document. This allows the operator to feed a paper document to the erasing apparatus 70 without paying attention to the degree of secrecy of the paper document, so that the erased sheet of paper can be discharged to an appropriate discharge tray according to the degree of secrecy of the paper document.

In the fourth embodiment described above, the type of a paper document is automatically determined when the paper document is erased in the erasing apparatus 70. If the document is of the non-erasable type, the paper document is not erased, and the operator is informed that the document is not erasable. This allows the operator to feed a paper document to the erasing apparatus 70 without paying attention to the erasability of the paper document. Therefore, when a paper document contains information such as secret information that should not be read by a third person, the paper document can be returned to the operator without erasing.

In the fourth embodiment described above, the type of a paper document is automatically determined when the paper document is erased in the erasing apparatus 70, and the paper document is discharged to an appropriate discharge tray according to the type of the paper document. This allows the operator to feed a paper document to the erasing apparatus 70 without paying attention to the degree of secrecy of the paper document, and the erased sheet can be discharged to an appropriate discharge tray according to the degree of secrecy of the paper document.

The embodiments described above can be embodied in a variety of other forms without departing from the spirit and essential characteristics of the embodiments. Therefore, the embodiments described above are to be considered in all respects as illustrative and not restrictive. The scope of the embodiments is defined by the accompanying claims and is not limited to the description in the specification. All modifications, various changes, substitutions, and variations made within the range of equivalency of the accompanying claims are within the scope of the embodiments.

What is claimed is:

1. A printed image erasing system configured to erase image information obtained by printing both characteristic identification information and document information or only the document information with an erasable color material on a printing medium,
comprising:
a printer unit configured to print the image information on the printing medium;
an erasing unit configured to erase an image printed on the printing medium with the erasable color material;
a reading unit configured to read the characteristic identification information on the printing medium to be erased by the erasing unit; and
a document management unit configured to manage an erasability condition of the document information on the basis of the characteristic identification information and instruct the printer unit to output new document information according to the erasability condition of the document information, the erasability condition being contained in the characteristic identification information read by the reading unit.

2. The printed image erasing system according to claim 1, wherein, the erasability condition is version information; and when an old version of a document is erased, a latest version of the document is outputted from the printer unit.

3. The printed image erasing system according to claim 1, wherein, the erasability condition is information about a retention period; and when a document within the retention period is erased, the contents of the document are outputted from the printer unit.

4. A printed image erasing system configured to prompting a user to erase image information obtained by printing both characteristic identification information and document information or only the document information with an erasable color material on a printing medium,
comprising:
a printer unit configured to print the image information on the printing medium;
an erasing unit configured to erase an image printed on the printing medium with the erasable color material;
a reading unit configured to read the characteristic identification information on the printing medium to be erased by the erasing unit;
an announcement unit configured to announce erasure of the image information by the erasing unit; and
a document management unit configured to manage the necessity of erasing the document information on the basis of the characteristic identification information, extract, on the basis of the characteristic identification information of a document instructed to be outputted from the printer unit, another existing document necessary to be erased, and instruct the announcement unit to announce erasure of the existing document.

5. A printed image erasing system configured to erase image information obtained by printing both characteristic identification information and document information or only the document information with an erasable color material on a printing medium,
comprising:
a printer unit configured to print the image information and the characteristic identification information on the printing medium;
an erasing unit configured to erase an image printed on the printing medium with the erasable color material;
a reading unit configured to read the image information on the printing medium to be erased by the erasing unit;
a plurality of discharge units prepared for the printing medium conveyed to the erasing unit; and
a document management unit configured to manage a discharge destination condition for the document information on the basis of the characteristic identification information and discharge the printing medium to one of the discharge units that corresponds to the discharge destination condition according to the characteristic identification information read by the reading unit.

6. The printed image erasing system according to claim 5, wherein the discharge destination condition is erasability of a printed image.

7. The printed image erasing system according to claim 5, wherein the discharge destination condition is a level of secrecy.

* * * * *